United States Patent
Dyrla et al.

(10) Patent No.: US 9,008,942 B2
(45) Date of Patent: Apr. 14, 2015

(54) METHOD OF MANAGING AN ENGINE FAILURE ON A MULTI-ENGINED AIRCRAFT HAVING A HYBRID POWER PLANT

(71) Applicant: Airbus Helicopters, Marignane, Cedex (FR)

(72) Inventors: Nadine Dyrla, Bouc Bel Air (FR); Matthieu Connaulte, Eguilles (FR); Joris Cezard, Saint Chamas (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 14/060,802

(22) Filed: Oct. 23, 2013

(65) Prior Publication Data

US 2014/0117148 A1    May 1, 2014

(30) Foreign Application Priority Data

Oct. 29, 2012    (FR) .................................. 12 02897

(51) Int. Cl.
*G06F 19/00*    (2011.01)
*B64C 19/00*    (2006.01)
*B64C 27/14*    (2006.01)
(Continued)

(52) U.S. Cl.
CPC ................. *B64C 19/00* (2013.01); *B64C 27/14* (2013.01); *B64D 27/24* (2013.01); *B64D 31/00* (2013.01); *B64D 35/02* (2013.01); *B64D 35/08* (2013.01);
(Continued)

(58) Field of Classification Search
CPC ...................................................... B64C 27/04

USPC ............................................................ 701/99
See application file for complete search history.

(56) References Cited

U.S. PATENT DOCUMENTS 5,831,429 A    11/1998    Germanetti
8,201,414 B2    6/2012    Haehner et al.
(Continued)

FOREIGN PATENT DOCUMENTS

DE    102007017332    10/2008
DE    102010021025    11/2011
(Continued)

OTHER PUBLICATIONS

French Search Report for FR 1202897, Completed by the French Patent Office on Jul. 18, 2013, 6 Pages.

*Primary Examiner* — James Trammell
*Assistant Examiner* — Michael D Lang
(74) *Attorney, Agent, or Firm* — Brooks Kushman P.C.

(57) ABSTRACT

A method of managing an engine failure on a rotary wing aircraft (1) having a hybrid power plant (5) with at least two fuel-burning engines (13, 13'), at least one electric machine (12), and a main gearbox (11). Said aircraft (1) also has electrical energy storage means (14) and a main rotor (2) mechanically connected to said hybrid power plant (5). In said method, during each flight, the operation of said engines (13, 13') is monitored in order to detect a failure of any one of them, and then once a failure of one of said engines (13, 13') has been detected, said electric machine (12) is controlled, if necessary, to deliver auxiliary power $W_e$ in order to avoid a deficit appearing in the total power $W_T$ of said hybrid power plant (5), thereby enabling the pilot of said aircraft (1) to fly said aircraft (1) safely without degrading said hybrid power plant (5).

23 Claims, 1 Drawing Sheet

(51) Int. Cl.
  *B64D 27/24* (2006.01)
  *B64D 31/00* (2006.01)
  *B64D 35/02* (2006.01)
  *B64D 35/08* (2006.01)
  *B64D 27/02* (2006.01)

(52) U.S. Cl.
  CPC ........... *B64D 2027/026* (2013.01); *Y02T 50/64* (2013.01); *Y02T 50/44* (2013.01)

(56) References Cited

U.S. PATENT DOCUMENTS

| | | |
|---|---|---|
| 8,336,814 B2 | 12/2012 | Reinhardt |
| 8,464,980 B2 | 6/2013 | Certain |
| 2010/0319357 A1 | 12/2010 | Gazzino et al. |
| 2012/0025032 A1 | 2/2012 | Hopdjanian et al. |
| 2013/0092789 A1* | 4/2013 | Botti et al. .................. 244/54 |

FOREIGN PATENT DOCUMENTS

| | | |
|---|---|---|
| EP | 0747710 | 12/1996 |
| EP | 2264297 | 12/2010 |
| EP | 2327625 | 6/2011 |
| FR | 2735239 | 12/1996 |
| FR | 2914697 | 10/2008 |
| FR | 2947006 | 12/2010 |
| FR | 2952907 | 5/2011 |
| FR | 2961767 | 12/2011 |
| FR | 2962404 | 1/2012 |

* cited by examiner

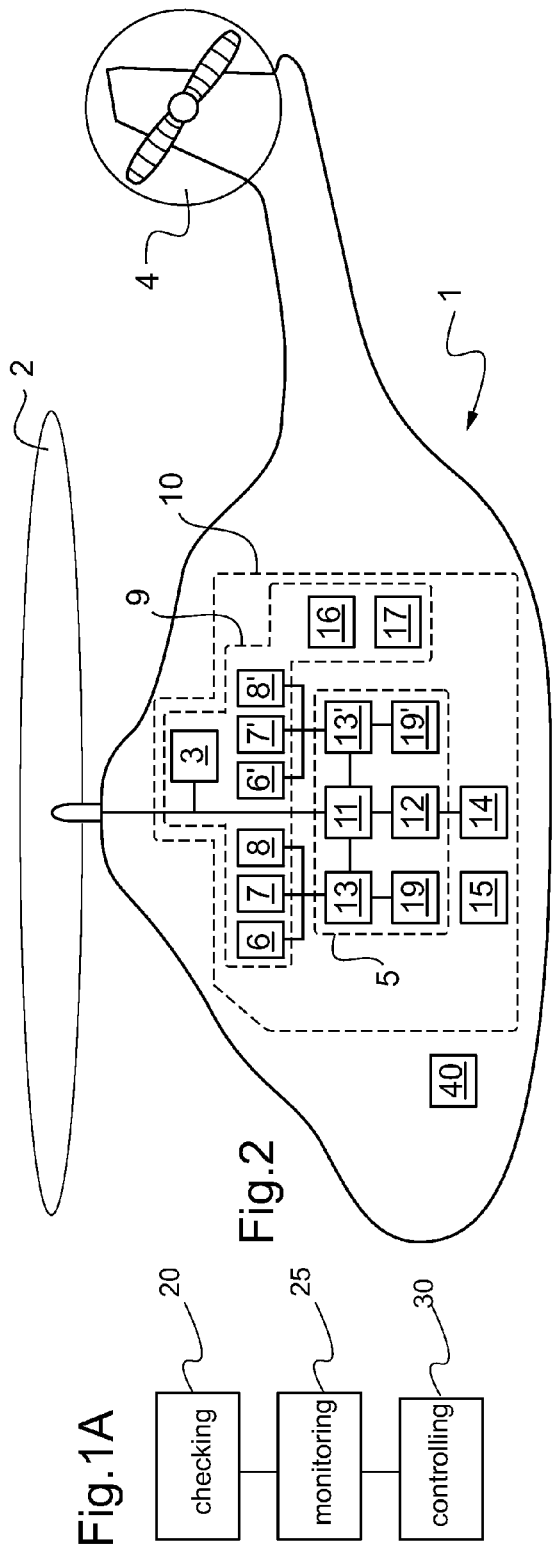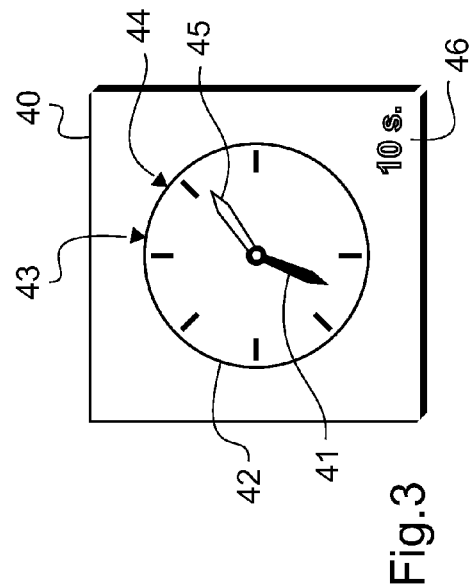

METHOD OF MANAGING AN ENGINE FAILURE ON A MULTI-ENGINED AIRCRAFT HAVING A HYBRID POWER PLANT

CROSS REFERENCE TO RELATED APPLICATIONS

The present application claims priority to French patent Application No. FR 12/02897 filed Oct. 29, 2012, the disclosure of which is incorporated in its entirety by reference herein.

BACKGROUND OF THE INVENTION (1) Field of the Invention

The present invention lies in the technical field of power plants for rotary wing aircraft. The invention relates to a method of managing an engine failure on a rotary wing aircraft having a hybrid power plant with at least two fuel-burning engines. The invention also relates to a rotary wing aircraft having such a hybrid power plant and including a device for managing an engine failure.

(2) Description of Related Art

A rotary wing aircraft is conventionally provided with at least one main rotor for providing it with lift and possibly also propulsion, and generally with a tail rotor in particular for opposing the yaw torque exerted by the main rotor on the fuselage of the aircraft and also to enable the yaw movements of the aircraft to be controlled.

In order to drive the main rotor and the tail rotor in rotation, the aircraft has a power plant that may include one or more engines.

A distinction is drawn between aircraft of the "single-engined" type, in which the power plant has only one engine for driving the main rotor and the tail rotor, and aircraft of the "multi-engined" type, in which the power plant has at least two engines for this purpose, with this type including in particular aircraft of the "twin-engined" type, where the power plant has two engines.

It should be observed that throughout the present specification, the term "engine" is used to designate a fuel-burning engine such as a turboshaft engine or a piston engine suitable for use in such a power plant. The term "engine" should be contrasted with the term "electric motor" designating a motor driven by electrical power.

Single-engined aircraft present advantages over multi-engined aircraft, such as reasonable cost, reduced maintenance operations, and relatively low fuel consumption. Nevertheless, such single-engined aircraft also present drawbacks.

In the event of damage to the single engine, the power plant and consequently the single-engined aircraft, presents performance that is degraded, possibly to such an extent as to be incapable of driving the main rotor and the tail rotor. Under such circumstances, the pilot of the aircraft must enter into an autorotation stage of flight, and must then perform an emergency landing, with the main rotor being in autorotation. This constitutes a difficult operation in the piloting of aircraft and in particular of single-engined aircraft, and is one of the main reasons for aircraft of this type having a reduced flight envelope and restricted use.

The flight envelope and the missions that can be authorized for single-engined aircraft are restricted by the certification authorities that issue flight authorizations. For example, in Europe, a single-engined aircraft is not permitted to overfly a large city.

In contrast, aircraft having at least two engines, such as twin-engined aircraft, make it possible firstly, with both engines operating simultaneously, to achieve improved performance, in particular in terms of transportable payloads and maximum range, and secondly, in the event of one of the engines failing, to make the flight capacity of such aircraft safer since each of the engines can take over from the other. As a result, flight restrictions such as overflying a large city, do not apply for this type of aircraft.

Nevertheless, the flight capacities authorized for such aircraft can still be limited compared with their maximum capacities in order to ensure some minimum level of safety in flight. In the event of an engine failing, it is sometimes necessary for a twin-engined aircraft to be able to continue flying on one engine, and thus with reduced performance. Certification authorities take account of such reduced performance while using a single engine when defining the capacities that are authorized for such aircraft, such as maximum weights on takeoff and landing.

In order to avoid pointlessly limiting the flight envelope of such aircraft, it is appropriate to have a level of power that is available with only one engine that is sufficiently high to be able to accommodate the risk of a failure. Certain twin-engined aircraft thus have their engines dimensioned so as to enable the aircraft to be used with only one of its engines, and they are thus over-engined in normal flight, i.e. when both engines are operating together. The main consequences of this are an increase in the fuel consumption of the aircraft, which can be made worse by the increase in its empty weight.

A multi-engined aircraft, such as a twin-engined aircraft having two turboshaft engines, for example, has various operating ratings. Firstly, when both engines are operating, the aircraft operates under all engines operative (AEO) ratings. Each engine then has a maximum continuous power (MCP) rating that can be used with no limit on time and a maximum takeoff power (max TOP) rating in which it delivers power greater than the MCP, but which is generally limited to being used for 5 minutes on civil aircraft, this rating being intended specifically for stages of takeoff and landing, and also for short duration hovering flight.

In the event of an engine failure on a multi-engined aircraft, a failure of at least one engine leads to power from that engine being lost in part or in full. In such an aircraft, the probability of having a failure simultaneously on a plurality of engines is relatively low, in compliance with the regulations that are in force. Generally, in the event of an engine failure, at least one other engine remains fully operational and the engine(s) that remain operational is/are capable of providing the aircraft with drive.

For a twin-engined aircraft having two turboshaft engines, the aircraft then operates in a degraded mode with a single engine that remains operational and that presents various contingency overpower ratings labeled with the acronym OEI for "one engine inoperative". For the turboshaft engine that remains operational, these ratings are conventionally:

a first contingency rating referred to as OEI 30", associating a supercontingency power level with a usable duration of about thirty consecutive seconds;

a second contingency rating referred to as OEI 2', associating a maximum contingency power level with a usable duration of two minutes; and a third contingency rating, referred to as OEI Cont, associating an intermediate contingency power level with a usable duration that is unlimited, e.g. until the end of the flight.

It should be observed that some engines propose a single contingency rating, referred to as OEI 2'30", that replaces the contingency ratings OEI 30" and OEI 2', with this single rating being usable for a duration of two minutes and thirty seconds.

The intermediate contingency rating OEI Cont is used in particular for providing cruising flight, whereas the OEI 30" power rating and the OEI 2' power rating or the single OEI 2'30" power rating are for use in performing particular maneuvers such as avoiding an obstacle, hovering, or landing.

Furthermore, it is possible to use the OEI 30" power rating only two or three times, depending on the aircraft and until it lands, whereas the OEI 2' power rating and the OEI 2'30" power rating can be used several times over for a total accumulated time not exceeding a length of time as predetermined by the manufacturer of the aircraft and as specified in maintenance manuals, e.g. ten minutes.

The extra power delivered by the single engine that is available after a failure is obtained by stressing the engine beyond its normal operation and its nominal limits. As a result, such operation needs to be followed by special maintenance with associated costs that can be significant.

Furthermore, the operating durations for the OEI 30" power rating, for the OEI 2' power rating, and for the OEI 2'30" power rating are limited to avoid leading to major, and possibly also immediate, damage to the turboshaft engine or to the power transmission means, such as the main gearbox or "MGB".

Other solutions have been investigated for delivering such extra power, in particular in order to be able to avoid overdimensioning the engines, but none have yet been applied industrially. For example, the extra power may be obtained by injecting water or a water/alcohol mixture into the air inlet of the engine or by cooling hot parts of the engine by circulating air or water. It is also possible to inject a self-igniting fuel downstream from the combustion chamber of the engine or indeed to use an auxiliary power unit including a fuel-burning engine, e.g. running on kerosene or hydrazine.

The OEI 30", OEI 2', OEI 2'30", and OEI Cont power ratings are controlled by an electronic control unit of the engine. Each engine is connected to such a control unit that is commonly referred to as an electronic engine control unit or "EECU".

This type of EECU is present on most aircraft for controlling the operation of the engine(s). In certain aircraft, the EECU is replaced by an engine computer, commonly referred to by the acronym FADEC for "full authority digital engine control". Such a FADEC engine computer has greater authority than an EECU and thus limits pilot intervention in controlling the engine(s).

One solution envisaged for improving the performance of aircraft is to use a "hybrid" power plant.

As in the automobile field, a "hybrid" power plant has at least one fuel-burning engine and at least one electric motor, the driving power from the hybrid power plant being delivered either by the engine on its own, or by the electric motor on its own, or indeed by both together. For the particular circumstance of twin-engined aircraft, a hybrid power plant has two engines that operate simultaneously together with at least one electric motor.

For example, document FR 2 952 907 describes a hybrid power plant used on a single-engined aircraft having a single engine together with a first electric motor that is mechanically connected to the main rotor of the aircraft, and a second electric motor that is mechanically connected to the tail rotor. That hybrid power plant also has a set of batteries for storing the electrical energy needed for electrically powering the two electric motors.

Those electric motors can act in addition to or as a replacement for the engine in order to drive the main and tail rotors. Furthermore, those electric motors may operate in generator mode for transforming mechanical power into electrical power, and also for slowing down the rotors or indeed the engine.

Document FR 2 962 404 describes the electrical architecture of a hybrid power plant for a rotary wing aircraft. That power plant has at least one engine and at least one electric motor together with a main electricity network and an auxiliary electricity network. The main electricity network is for providing the general electricity power supply of the aircraft, while the auxiliary electricity network is dedicated to the system for hybridizing the hybrid power plant.

Document DE 10 2007 017332 describes an aircraft having a propulsion unit constituted by a propeller, an engine driving the propulsion unit, and an electric machine. The electric machine co-operates with the engine, operating either as an electric motor or as an electricity generator. The electric motor thus delivers additional power to the engine, lying in the range 15% to 35% of the power of the engine.

Furthermore, document FR 2 914 697 relates to a turboshaft engine, in particular for a helicopter, having a compressor and a free turbine, together with an electric motor connected to the compressor. The electric motor enables the turboshaft engine to have better acceleration capacity while maintaining the same surge margin by providing an additional quantity of rotary kinetic energy to the compressor during a stage of accelerating the turboshaft engine.

Finally, document FR 2 961 767 describes a method of managing an electric circuit of a vehicle that has an engine for driving a propulsion member and a reversible electric machine connected to at least one battery. That method enables the electric machine to operate in generator mode in order to recharge the battery, or else in motor mode in order to drive the propulsion member.

In addition, the technological background includes in particular the documents FR 2 947 006, DE 10 2010 021025, and FR 2 735 239.

However, one of the major drawbacks of using electric motors is storing the electrical energy needed to operate them. Several solutions exist for storing this electrical energy, such as batteries, thermal batteries, or supercapacitors, but each of them has its own constraints.

For example, batteries are heavy or indeed very heavy if a large quantity of electrical energy is to be stored, whereas supercapacitors are capable of delivering a high level of electrical power, but only during a very limited length of time. Furthermore, thermal batteries are for single use only and the length of time they operate after being activated is limited.

Whatever the means used for storing electrical energy, the quantity of electrical energy that is available remains limited, while the weight of the electrical energy storage means can be considerable.

Thus, any improvement in performance that it might be possible to obtain by using one or more electric motors within the power plant of an aircraft suffers from various limitations associated with storing electrical energy. For example, it is necessary to find a balance between the improvement in performance of the hybrid power plant and the increase in weight caused by using such electrical energy storage means that are needed to operate the electric motor(s).

BRIEF SUMMARY OF THE INVENTION

An object of the present invention is thus to provide a method of managing an engine failure on a rotary wing aircraft having a hybrid power plant that includes at least two fuel-burning engines. Following a failure of at least one engine of the aircraft, the method thus enables the pilot to fly the aircraft safely, i.e. with sufficient driving power and without that stressing each engine that remains operational beyond predetermined operating conditions.

According to the invention, the invention provides a method of managing an engine failure on a rotary wing aircraft having a hybrid power plant provided with at least two fuel-burning engines, at least one electric machine, a main gearbox "MGB", and at least one electronic engine control unit "EECU", each EECU being connected to a respective engine. The aircraft also has at least one electrical energy storage means for powering the electric machine and at least one main rotor that is driven during each flight at an instantaneous speed of rotation $N_r$ by the hybrid power plant.

In normal operation, each engine of the hybrid power plant can deliver at least a maximum continuous power MCP rating to the MGB, and in contingency operation, in particular following a failure of one of the engines of the hybrid installation, each remaining engine can deliver OEI 30", OEI 2', and OEI Cont power ratings.

In addition, the levels of power delivered by each engine and by each electric machine add together so that the hybrid power plant delivers total driving power $W_T$ to the MGB. However, this total driving power $W_T$ is usually constituted solely by the sum of the power levels delivered by the engines, while each electric machine has the potential of delivering auxiliary power in the event of a specific need, in particular in the event of at least one engine failing.

The term "speed of rotation" concerning the main rotor is commonly used by the person skilled in the art to designate the frequency of rotation of the main rotor of an aircraft. This speed of rotation of the main rotor is then expressed either in radians per second (rad/s) or else in revolutions per minute (rpm).

Furthermore, during each flight, the main rotor of a rotary wing aircraft has a nominal speed of rotation that is defined by the manufacturer of the aircraft, with a relationship for variation in this nominal speed of rotation optionally being defined as a function of various flight parameters, such as altitude, temperature, or forward speed, for example.

Furthermore, by default, an electric machine is a reversible machine. It can therefore operate in motor mode, i.e. such that the electric machine transforms electrical power into mechanical power, and it can also operate in generator mode, i.e. such that the electric machine transforms mechanical power into electrical power. Furthermore, the electric machine may be a brushless motor.

The electric machine may be placed in various positions within the hybrid power plant, as described in document FR 2 952 907. For example, it may be connected to the MGB, to an engine, or directly to the main rotor of the aircraft.

The method of the invention is remarkable in that it comprises three steps:

a checking step, in which the operation of each engine of the aircraft is checked during each flight by means of the EECU in order to detect a failure, if any, of at least one engine, an engine being considered as having failed when at least one other engine of the hybrid power plant uses its contingency power ratings;

a monitoring step during which a monitoring value is determined relating to at least one monitoring parameter of the aircraft and a detection threshold is determined for detecting a deficit in the total power $W_T$, a comparison then being performed by comparing the monitoring value with the detection threshold in order to identify a risk of a deficit in the total power $W_T$, the deficit in the total power $W_T$ appearing whenever at least one engine needs to deliver power greater than a predetermined power $W_P$; and a control step, during which, when a failure of at least one engine is detected and the detection threshold for detecting a deficit in the total power $W_T$ is crossed, the electric machine is controlled to deliver auxiliary power $W_e$ so that the total driving power $W_T$ from the hybrid power plant is sufficient to fly the aircraft safely, thus avoiding a deficit in the total power $W_T$ appearing, each engine that remains operational not delivering power greater than the predetermined power $W_P$.

During an engine failure on a multi-engined aircraft, at least one engine generally remains fully operational. Under such circumstances, the aircraft then operates in a degraded mode with each engine that remains operational then possibly operating at one of the above-mentioned OEI power ratings under the control of the EECU of each engine.

Nevertheless, the method of the invention seeks to limit or even avoid such operation of each remaining engine at OEI power ratings by delivering auxiliary power $W_e$ to the MGB via the electric machine of the hybrid power plant.

The behavior of an engine during such an engine failure is characterized by a drop in the power from that engine, which may lead to a drop in the total driving power $W_T$ delivered by the hybrid power plant to the MGB, and consequently to a drop in the power at the main rotor and at the tail rotor of the aircraft.

Firstly, in order to detect such a failure of at least one engine of the aircraft, throughout each flight of the aircraft, the operation of each engine is checked during a checking step. Such checking and failure detection are generally performed in conventional manner via each EECU, or indeed via each FADEC computer when the aircraft has any. Each EECU or each FADEC computer manages the OEI limits on the power of such engines in normal operation, and in the event of a failure of at least one engine of the hybrid power plant, it enables the OEI limit to be raised for each engine that remains operational, and consequently allows each engine that remains operational to make use of the OEI 30", OEI 2', and OEI Cont power ratings.

Such detection of a failure may also be performed using another instrument of the aircraft commonly known as a first limit indicator (FLI), which indicates certain limits on the use of the aircraft and of each engine in its power plant.

During a failure of an engine, at least one other engine of the hybrid power plant remains operational, i.e. is capable of delivering driving power to the MGB.

Thus, when an engine has indeed failed, the maximum total driving power $W_T$ that the hybrid power plant can deliver to the MGB, and consequently the maximum power available at the main rotor of the aircraft, is naturally reduced compared with when all of the engines are operational, since the engine that has failed is delivering a degraded power level or indeed no power at all. Consequently, when the pilot loads the main rotor of the aircraft to perform some special maneuver, such as hovering, landing, or gaining altitude in order to avoid an obstacle, the power demanded by the main rotor increases and consequently the power needed at the MGB to drive the main rotor also increases. This power needed at the MGB may then be greater than the total driving power $W_T$ that is available, i.e. greater than the sum of the powers that each engine that remains operational can deliver under predetermined operating conditions for said engine(s). A deficit then appears in the total power $W_T$ compared with the power needed at the MGB.

The above-mentioned predetermined operating conditions are characterized mainly by a predetermined power level $W_P$ that each engine must not exceed, or that may be exceeded in limited manner only. This deficit in total power $W_T$ then appears as soon as at least one engine needs to deliver power greater than said predetermined power $W_P$, and the deficit corresponds to the difference between the power needed at the MGB and the sum of the predetermined powers $W_P$ from each engine remaining operational.

During a monitoring step, a monitoring value is determined relating to at least one monitoring parameter of the aircraft and to a detection threshold for detecting a deficit in total power $W_T$. By way of example, each monitoring parameter may be a characteristic of each engine or it may be a characteristic of the operation of the main rotor, and the monitoring value may be equal to a single monitoring parameter or it may be equal to a combination of a plurality of monitoring parameters. Thereafter, comparing the monitoring value with the detection threshold for detecting a deficit in total power $W_T$ serves to identify a risk, if any, of there being a deficit in the total power $W_T$, and consequently makes it possible to anticipate its appearance.

The detection threshold for detecting a deficit in the total power $W_T$ corresponds to a limit for the monitoring parameter that corresponds to the appearance of a deficit in the total power $W_T$, while taking account of a safety margin, thus making it possible to anticipate the appearance of a deficit in the total power $W_T$. This limit for the monitoring value is a function of the monitoring value, i.e. of each parameter used for determining the monitoring value and also of conditions of flight, given that the safety margin is determined by the person skilled in the art as a function of the desired degree to which a deficit in the total power $W_T$ is to be anticipated.

A risk of there being a deficit in the total power $W_T$ is thus identified as soon as the monitoring value crosses the detection threshold so as to be able to anticipate the appearance of this deficit in the total power $W_T$. Depending on the monitoring parameter(s) used for determining the monitoring value, the detection threshold may be an upper limit or it may be a lower limit for the monitoring value.

In order to avoid this deficit in the total power $W_T$ appearing, auxiliary power $W_e$ needs to be delivered to the MGB so as to enable the aircraft to carry out safely the maneuver requested by the pilot. This auxiliary power $W_e$ is conventionally obtained by the engines that remain operational and that are capable of delivering the OEI 30", OEI 2', and OEI Cont power ratings.

Advantageously, the method of the invention makes it possible for the electric machine of the hybrid power plant to deliver this auxiliary power $W_e$ during a control step. Thus, when a failure of at least one engine has been detected and when the appearance of a deficit in the total power $W_T$ is anticipated, i.e. when the detection threshold is crossed, the electric machine operating in motor mode is controlled to deliver the auxiliary power $W_e$ to the MGB, with this auxiliary power $W_e$ then being added to the power delivered by each engine that remains operational. The total driving power $W_T$ from the hybrid power plant then suffices to maneuver the aircraft safely and each engine that remains operational continues to deliver power that is less than the predetermined power $W_P$.

Thus, the method of the invention makes it possible to accommodate load peaks for each engine that remains operational without stressing it beyond its predetermined power $W_P$. This method thus comes within the context of enabling rotary wing aircraft to fly safely in the event of a failure of at least one of the engines with which they are fitted.

Various implementations of the invention may correspond to various predetermined operating conditions of the engines in the hybrid power plant of the aircraft.

In a first implementation of the invention, the predetermined power $W_P$ of each engine is the OEI 30" power rating of the engine. Each engine is dimensioned so as to be capable of delivering this OEI 30" power rating during the failure of at least one other engine of the hybrid power plant. As a result, such engines are overdimensioned in normal flight, with the consequence of an increase in the fuel consumption of the aircraft and in its empty weight. Advantageously, by providing this auxiliary power $W_e$, the method of the invention makes it possible to limit the extent to which engines need to be overdimensioned, and consequently makes it possible to reduce the increase in the fuel consumption of the aircraft and possibly also in its empty weight.

In a second implementation of the invention, the predetermined power $W_P$ of each engine is the OEI 2' power rating of the engine. As in the first implementation of the invention, by providing this auxiliary power $W_e$, the method of the invention advantageously makes it possible to limit such overdimensioning of the engines, in particular concerning this OEI 2' power rating, and consequently makes it possible to reduce the increase in the fuel consumption of the aircraft and possibly also in its empty weight.

In a third implementation of the invention, the predetermined power $W_P$ of each engine is the OEI Cont power rating of the engine. As for the first and second implementations of the invention, by providing this auxiliary power $W_e$, the method of the invention advantageously makes it possible to limit this overdimensioning of the engines, in particular concerning this OEI Cont power rating, and consequently makes it possible to reduce the increase in the fuel consumption of the aircraft, and possibly also in its empty weight.

In a fourth implementation of the invention, the predetermined power $W_P$ of each engine is the maximum continuous power MCP of the engine. Under such circumstances, the method of the invention makes it possible to avoid using the OEI 30", OEI 2', and OEI Cont power ratings in the event of a failure of an engine, with the auxiliary power $W_e$ delivered by the electric machine being sufficient to compensate for the engine failure. As a result, since the engines are not overdimensioned in order to be capable of being used in the OEI 30", OEI 2', and OEI Cont power ratings, there is no increase in the fuel consumption of the aircraft, and possibly no increase in its empty weight. Furthermore, the method of the invention makes it possible to eliminate the specific maintenance costs that are associated with using these OEI 30", OEI 2', and OEI Cont power ratings, and also to eliminate the resulting time the aircraft is not available for operation.

Furthermore, the checking and monitoring steps may be sequential or they may be simultaneous. During the control step, the auxiliary power $W_e$ is delivered under two conditions, firstly the presence of a failure of at least one engine, and secondly the crossing of the detection threshold. It is entirely possible for the monitoring value to be compared with the detection threshold after the failure of at least one engine has been detected, with the checking and monitoring steps then being sequential.

Nevertheless, in order to be more reactive in triggering the delivery of auxiliary power $W_e$, it is possible for the detection of the failure of at least one engine and the comparison of the monitoring value with the detection threshold to be performed in parallel, with the checking and monitoring steps then being simultaneous.

The electric machine is powered with electrical energy by the electrical energy storage means, and they are limited in capacity. It is therefore important to limit the use of the electric machine in motor mode to the bare minimum so as to minimize the consumption of this electrical energy and thus minimize the potential length of time the electric machine can be used, and consequently the weight of the storage system.

Once the energy in the electrical energy storage means has been consumed, the method of the invention can no longer be used to avoid a deficit in the total power $W_T$ appearing after an engine has failed. It is therefore essential to avoid using the electric machine immediately on detecting the failure of an engine, but to use it only when necessary, i.e. when both a failure of at least one engine has been detected and the detection threshold has also been crossed. Thus, the electrical energy contained in the electrical energy storage means is conserved and used optimally, while guaranteeing that the aircraft can perform maneuvers safely in spite of the engine failure.

The electric machine preferably delivers the minimum amount of auxiliary power $W_e$ needed to supplement the predetermined power $W_P$ delivered by each engine that remains operational. For example, the auxiliary power $W_e$ may be controlled via the monitoring parameter. The monitoring parameters begin to change as soon as the auxiliary power $W_e$ is delivered by the electric machine to the MGB, and the operation of each engine is limited to the predetermined power $W_P$.

It is nevertheless possible that the electric machine will deliver its maximum power to the MGB, with the EECU of each engine that remains operational then controlling the operation of those engines so that they deliver only the minimum needed amount of power to the MGB.

During the monitoring step of the method of the invention, each monitoring parameter may be a characteristic of each engine or it may be an operating characteristic of the main rotor of the aircraft.

For example, a first monitoring parameter is the torque $C_M$ delivered by each engine and measured by first measurement means. In the event of a failure of an engine, the torque $C_M$ from each engine that remains operational increases with the power from that engine and is therefore representative of the power of that engine. Thus, if the torque $C_M$ from an engine that remains operational is greater than a first detection threshold for detecting a deficit in the total power $W_T$, that means that the engine is delivering power close to or greater than the predetermined power $W_P$ and that a risk of there being a deficit in the total power $W_T$ from the hybrid power plant has been identified. This first detection threshold corresponds to an upper limit for the torque $C_M$ corresponding to the appearance of a deficit in the total power $W_T$ plus a safety margin making it possible to anticipate the appearance of such a deficit in the total power $W_T$.

Furthermore, if the engines of the hybrid power plant are turboshaft engines, a second monitoring parameter may be the temperature T4 of the combustion chamber of each turboshaft engine, as measured by second measurement means. In the event of a failure of an engine, the temperature T4 of the combustion chamber of the other engine that remains operational increases with the power delivered by that engine, and is thus representative of the power delivered by that engine. Thus, if the temperature T4 of the combustion chamber of an engine that remains operational is greater than a second detection threshold for detecting a deficit in the total power $W_T$, that means that the engine is delivering power close to or greater than the predetermined power $W_P$ and that a risk of a deficit in the total power $W_T$ from the hybrid power plant has been identified. This second detection threshold corresponds to an upper limit for this temperature T4 corresponding to the appearance of a deficit in the total power $W_T$ plus a safety margin, thus making it possible to anticipate the appearance of such a deficit in the total power $W_T$.

Likewise, when the engines are turboshaft engines, a third monitoring parameter is the instantaneous speed of rotation N1 of a compressor of each engine, as measured by third measurement means. In the event of a failure of an engine, the instantaneous speed of rotation N1 of the compressor of each other engine that remains in operation increases with the power delivered by that engine, and is thus representative of the power delivered by that engine. Thus, if this instantaneous speed of rotation N1 of the compressor of an engine that remains in operation is greater than a third detection threshold for detecting a deficit in the total power $W_T$, that means that the engine is delivering power close to or greater than the predetermined power $W_P$ and that a risk of a deficit in the total power $W_T$ from the hybrid power plant has been identified. This third detection threshold corresponds to an upper limit for the instantaneous speed of rotation N1, corresponding to the appearance of a deficit in the total power $W_T$ plus a safety margin, thus making it possible to anticipate the appearance of such a deficit in the total power $W_T$.

By way of example, it may also be advantageous to compare the behavior of two engines by using one of these three parameters. Simultaneous use of a plurality of engines constitutes balanced use, with each engine delivering an equal level of power to the MGB. For example, in the event of one of the engines failing, the instantaneous speed of rotation N1 of a compressor in the failed engine becomes much less than the instantaneous speed of rotation N1 of a compressor in an engine remaining operational. Thus, a difference between the instantaneous speeds of rotation N1 for the compressors of two engines can be a characteristic indicative of a failure of one of those engines and can constitute a monitoring value.

The values of these three monitoring parameters, which are characteristics of each of the engines, may be obtained via the EECU of each engine.

In addition, in certain aircraft, the EECU may be replaced by a FADEC engine computer. The FADEC engine computer is also capable of delivering the values of these three monitoring parameters.

Finally, a fourth monitoring parameter may be the instantaneous speed of rotation $N_r$ of the main rotor of the aircraft, as measured by fourth measurement means. In the event of a failure of an engine, this instantaneous speed of rotation $N_r$ of the main rotor drops with the drop in power of the main rotor. Furthermore, since the main rotor is driven in rotation by the set of engines via the MGB, this drop in power at the main rotor may represent a deficit in the total power $W_T$ from the hybrid power plant. Thus, if this instantaneous speed of rotation $N_r$ of the main rotor is less than a fourth detection threshold for detecting a deficit in the total power $W_T$, that means that a risk of a deficit in the total power $W_T$ from the hybrid power plant has been identified. This fourth detection threshold corresponds to a lower level for the instantaneous speed of rotation $N_r$ corresponding to the appearance of a deficit in the total power $W_T$ from which a safety margin is subtracted, thus making it possible to anticipate the appearance of such a deficit in the total power $W_T$.

It can thus be seen that each monitoring parameter may be compared with a detection threshold on the basis of which it is possible to consider that a risk of a deficit in the total power $W_T$ from the hybrid power plant has been identified. This detection threshold is generally an upper limit for the monitoring parameters that are characteristics of each of the engines, whereas it is a lower limit for the instantaneous speed of rotation $N_r$ of the main rotor, for example.

In addition, a plurality of monitoring parameters may be combined in a pre-established relationship in order to determine the monitoring value. By way of example, this combination of monitoring parameters may serve to make the identification of a risk of a deficit in the total power $W_T$ more reliable. This pre-established relationship is generally specific to each engine and to each aircraft using such engines.

It is also possible to use the time derivative of each monitoring parameter in order to anticipate sooner and reliably the appearance of a deficit in the total power $W_T$ from the hybrid power plant. The time derivative of the monitoring parameter serves to detect a variation in the value of this monitoring parameter. For example, if the time derivative is positive with an absolute value that is large, it can be deduced that the value of this monitoring parameter is increasing rapidly. Furthermore, if the value of the monitoring parameter is close to its upper limit, it is possible to anticipate the appearance of a deficit in the total power $W_T$ from the hybrid power plant.

The time derivative of each monitoring parameter may be determined during the monitoring step and the monitoring value is determined in application of a pre-established relationship combining at least one monitoring parameter and its time derivative.

Furthermore, the monitoring parameters, e.g. the temperature T4 of the combustion chamber of an engine, may vary with flight conditions, such as the temperature outside the aircraft, its altitude, and its speed. As a result, the detection threshold, which is determined on the basis of at least one monitoring parameter, may itself also vary as a function of such flight conditions.

Advantageously, this auxiliary power $W_e$ is delivered immediately once the engine failure has been detected and the detection threshold has been crossed. An electric machine can deliver such auxiliary power $W_e$ as soon as it is put into operation, unlike an engine that requires a longer or shorter period of time to power up, depending on the type of engine.

Furthermore, this electrical power can be used in transient manner for the purpose of compensating part of the loss of power at the MGB as a result of at least one engine failing and for the time required for each of the engines that remain operational to speed up and deliver the necessary power.

Furthermore, the use of the method of the invention may make it possible to increase both the maximum takeoff weight of the aircraft and also its flight envelope.

The maximum takeoff weight of an aircraft may be limited by the performance of that aircraft in the event of at least one engine failing, in particular during the stage in which the engine(s) remaining operational is/are operating at the OEI 30", OEI 2', and OEI Cont power ratings.

As a result, and as mentioned above, delivering the auxiliary power $W_e$ may make it possible to limit the extent to which the engines are overdimensioned by reducing the OEI 30", OEI 2', and OEI Cont power ratings, or even by eliminating them, and consequently enabling the empty weight of the aircraft to be reduced and also enabling its fuel consumption to be reduced. This saving in the weight of the aircraft may make it possible firstly to increase the performance of the aircraft and secondly to increase its maximum takeoff weight.

In addition, with the performance of the aircraft improved and with its fuel consumption reduced, using the method of the invention also makes it possible to increase the flight envelope of such an aircraft.

Advantageously, in the method of the invention, display means of the aircraft are used to display information relating to the available auxiliary power $W_e$. The pilot of the aircraft is thus continuously aware of the level of the available auxiliary power $W_e$ and can manage the use of this available auxiliary power both to perform certain maneuvers without stressing each of the engines that remains operational beyond the predetermined power $W_P$, and also to conserve the amount of auxiliary power $W_e$ that remains available for enabling the pilot to perform a maneuver, e.g. in order to avoid an obstacle or indeed to land.

By way of example, this information may be in the form of the length of time it is possible to use this auxiliary power $W_e$ at its maximum level $W_{max}$, where this length of time is determined as a function of the electrical energy available in the storage means powering the electric machine.

In this method, the display means also display an indication indicating whether the method is in operation. The method is in operation when it is capable of delivering auxiliary power $W_e$ to the MGB on detecting a failure of at least one engine.

The method can be operational only while in flight and after a failure has been detected on at least one engine. Furthermore, the method might not be operational, e.g. because of a lack of energy in the storage means. This indication indicating whether the method is operational may be a color used on the display means for the information concerning the available auxiliary power $W_e$, e.g. green when the method is operational and red when the method is not operational. Thus, when all of the auxiliary power $W_e$ has been consumed, the display means display a potential utilization time for this auxiliary power $W_e$ of "0 seconds" and it does so in red.

It is also possible to display the available auxiliary power $W_e$ in the form of information about the maximum total driving power $W_T$ that the hybrid power plant can deliver, in a manner similar to the way available power is displayed for the OEI 30" and OEI 2' power ratings, where this maximum total driving power $W_T$ is the sum of the predetermined power $W_P$ from each engine that remains operational plus the available auxiliary power $W_e$. This information may then vary as a function of the electrical energy available in the electrical energy storage means.

Furthermore, the available auxiliary power $W_e$ is a function of the quantity of energy available in the storage means on board the aircraft. Thus, the greater the storage means, the greater the available auxiliary power $W_e$ or the longer the time this auxiliary power $W_e$ can be available.

By way of example, the electrical energy storage means may comprise at least one supercapacitor, which is a capacitor capable of delivering a high level of power for a short time, at least one kinetic energy storage system, at least one non-rechargeable battery, e.g. of the thermal battery type, or indeed at least one rechargeable battery.

Furthermore, the electric machine may be used in generator mode to transform into electrical energy the mechanical energy that is delivered by the engine or by the main rotor, for example.

Consequently, when the electrical energy storage means include at least one rechargeable means for storing such electrical energy for electrically powering the electric machine while it is operating in motor mode, the electric machine operating in generator mode can be used to deliver electrical energy for the purpose of charging each rechargeable storage means.

Furthermore, at least one rechargeable storage means may also be used for the general electricity power supply of the aircraft, in particular before an engine has been started, for the purpose of starting such an engine, and in the event of an emergency, whenever the primary electricity generator sources of the aircraft are no longer delivering enough energy to the avionics equipment so as to enable a flight to continue in complete safety. Each rechargeable storage means then replaces in full or at least in part the batteries conventionally used for the general electricity power supply of the aircraft for powering its avionics equipment and its electrical appliances.

As a result, the electric machine in generator mode can deliver the electrical energy needed for operating the electricity network of the aircraft, e.g. via a voltage converter, thereby replacing at least in part or possibly in full the main generator or the starter-generator conventionally present in the aircraft, it then being possible for the starter-generator to be limited merely to being a starter.

Advantageously, the increase in weight due to the electric machine and to the storage means is compensated in part by eliminating at least one main battery and/or at least one main generator that would conventionally be present in the aircraft.

When the storage means is used both for electrically powering the electric machine and for providing the general power supply of the aircraft, it is not possible for all of the electrical energy available in the storage means to be used for powering the electric machine. When flying under emergency conditions, after the failure of an engine or indeed of the main electricity generators, some of the electrical energy must be retained for powering the essential avionics equipment of the aircraft.

A fraction of the electrical energy available in the storage means is thus reserved for electrically powering this essential avionics equipment, while the remainder of the available electrical energy can be delivered to the electric machine for delivering auxiliary power $W_e$ to the MGB.

The present invention also provides a rotary wing aircraft having a device for managing the failure of an engine of this aircraft. The device is provided with a hybrid power plant having at least two fuel-burning engines, at least one electric machine, a main gearbox "MGB", and at least one electronic engine control unit "EECU", each EECU being connected to a respective engine. Each engine is capable of delivering at least a maximum continuous power MCP rating and OEI 30", OEI 2', and OEI Cont power ratings and the hybrid power plant delivers total driving power $W_T$ to the MGB.

This device for managing the failure of an engine also includes at least one electrical energy storage means and control means for controlling the electric machine. The aircraft also includes at least one main rotor driven in rotation by the hybrid power plant and rotating in flight at an instantaneous speed of rotation.

This device is remarkable in that it includes monitoring means for determining a monitoring value relating to at least one monitoring parameter of the aircraft and for determining a detection threshold for detecting a deficit in the total power $W_T$, and then performing a comparison by comparing the monitoring value with the detection threshold in order to identify a risk of a deficit in the total driving power $W_T$, the deficit in the total power $W_T$ appearing whenever at least one engine needs to deliver power greater than a predetermined power $W_P$. Finally, the control means communicate with the monitoring means and with the electric machine in order to perform the above-described method. The electric machine then delivers auxiliary power $W_e$ to the MGB, thus avoiding the appearance of this deficit in the total power $W_T$, this auxiliary power $W_e$ corresponding to the difference between the power needed at the MGB and the sum of the predetermined powers $W_P$ from each of the engines remaining operational.

The monitoring value may serve to identify a risk of a deficit in the total power $W_T$ either as a result of an increase in the power from at least one engine or as a result of a drop in the power at the main rotor.

This risk of a deficit in the total power $W_T$ may be identified by means of at least one monitoring parameter together with its time derivative that characterizes variation in the monitoring parameter.

For example, the monitoring means may comprise first measurement means for measuring the torque $C_M$ delivered by each engine and making it possible to evaluate any increase in the power from at least one engine.

If the engines are turboshaft engines, the monitoring means may also comprise second measurement means for measuring the temperature T4 of the combustion chamber of each turbine engine, or indeed third measurement means for measuring the instantaneous speed of rotation N1 of a compressor of each engine.

These three measurement means measuring characteristics of each engine serve to evaluate an increase in the power from that engine.

The monitoring means may also include fourth measurement means for measuring the instantaneous speed of rotation $N_r$ of the main rotor and serving to evaluate a drop in power at the main rotor.

Furthermore, the monitoring means may include a calculation unit and a memory, the calculation unit executing instructions stored in the memory suitable for determining the monitoring value, the detection threshold, and making a comparison between the monitoring value and the detection threshold. A risk of a deficit in the total power $W_T$ can thus be identified, e.g. by applying a pre-established relationship involving one or more monitoring parameters and possibly also their respective derivatives. Such a pre-established relationship is generally specific to each engine and also to each aircraft using such engines.

The storage means that power the electric machine electrically may comprise at least one rechargeable or non-rechargeable battery, at least one thermal battery, at least one supercapacitor, or indeed a kinetic energy storage system, e.g. of the flywheel type.

In order to inform the pilot about the available auxiliary power $W_e$, the device of the invention may display information about the available auxiliary power $W_e$ on display means of the aircraft. The device may also use the display means to display an indication indicating whether the device is operational.

For example, the information about available auxiliary power $W_e$ may specify the length of time that remains during which the auxiliary power $W_e$ can be used at its maximum value $W_{max}$ and corresponding to the amount of electrical energy that is available in the storage means for powering the electric machine.

It is also possible to display the available auxiliary power $W_e$ in the form of an indication of the maximum total driving power $W_T$ that the hybrid power plant can deliver, in a manner similar to the way in which available power is displayed for the OEI 30" and OEI 2' power ratings, this maximum total driving power $W_T$ being the sum of the predetermined power $W_P$ from each engine that remains operational plus the available auxiliary power $W_e$. This indication may then vary as a function of the electrical energy available in the electrical energy storage means.

In another embodiment of this device, the electric machine may operate in generator mode, then transforming mechanical energy from the main rotor or from at least one engine into electrical energy. When the storage means include at least one rechargeable electrical energy storage means, the electric machine then makes it possible to charge each of the rechargeable storage means.

The device may also include means for switching off the electrical power supply between the electric machine and the storage means. It is advantageous to be able to interrupt the electric circuit connecting these components together for safety reasons, in order to isolate these components, e.g. to provide protection against voltage surges that might damage them or even lead to a fire.

For the purpose of delivering auxiliary power, the electric machine may also be replaced by a motor having a source of energy other than electricity. For example, the electric machine may be replaced by a pneumatic motor or indeed by a pyrotechnic motor. In contrast, these types of motor are not reversible.

BRIEF DESCRIPTION OF THE SEVERAL VIEWS OF THE DRAWINGS

The invention and its advantages appear in greater detail from the following description of implementations given by way of illustration with reference to the accompanying figures, in which:

FIGS. 1A and 1B are two block diagrams of the method of the invention;

FIG. 2 shows a twin-engined aircraft fitted with a device of the invention; and

FIG. 3 shows display means of such a device.

Elements that are present in more than one of the figures are given the same references in each of them.

DETAILED DESCRIPTION OF THE INVENTION

FIGS. 1A and 1B describe two ways in which the method of the invention for managing an engine failure on a rotary wing aircraft 1 can be conducted. FIG. 2 shows a rotary wing aircraft 1 having a device 10 of the invention for managing engine failure.

The method and the device 10 thus enable the pilot to fly the aircraft safely, i.e. with sufficient engine power, in spite of a failure of an engine of the aircraft and without such safe flight causing the engine that remains operational to be stressed beyond predetermined operating conditions.

A device 10 of the invention, as shown in FIG. 2, comprises a hybrid power plant 5 having two fuel burning engines 13, 13', an electric machine 12 capable of delivering a maximum power $W_{max}$, a main gearbox "MGB" 11, and two electronic control units "EECU" 19, 19', each connected to a respective one of the engines 13, 13' and providing the operating characteristics of each engine 13, 13'. The device 10 also has electrical energy storage means 14, control means 15 for controlling the electric means 12, and monitoring means 9 provided with at least one measurement means, a calculation unit 17, and a memory 16.

The hybrid power plant 5 is suitable for driving rotation of a main rotor 2 of the aircraft 1, which rotor rotates in flight at an instantaneous speed of rotation $N_r$. The aircraft 1 also has measurement means 3 for measuring this instantaneous speed of rotation $N_r$ of the main rotor 2, and display means 40.

The method of the invention is made up of three steps. It has a checking first step 20 used during each flight of the aircraft 1 to check the operation of each engine 13, 13' in order to detect an engine failure. Thereafter, during a monitoring second step 25, a monitoring value is determined relating to at least one monitoring parameter and a detection threshold is determined for detecting a deficit in the total power $W_T$ of the hybrid power plant 5, after which a comparison is performed to compare the monitoring value with the detection threshold in order to identify any risk of there being a deficit in the total power $W_T$ from the hybrid power plant 5. Finally, during a control third step 30, the electric machine 12 is controlled to deliver auxiliary power $W_e$ to the MGB 11 so as to prevent such a deficit in total driving power $W_T$ appearing, thereby enabling the pilot to fly the aircraft 1 without the engine 13, 13' that remains operational being stressed beyond its predetermined operating conditions.

These predetermined operating conditions of the engines 13, 13' are characterized mainly by a predetermined power $W_P$ that each engine 13, 13' must not exceed, or at least that can be exceeded, but to an extent that must be limited. The deficit in the total power $W_T$ of the hybrid power plant 5 appears when at least one engine 13, 13' is to deliver power above this predetermined power $W_P$ and it corresponds to the difference between the power needed by the MGB 11 and the sum of the predetermined powers $W_P$ that the remaining engines 13, 13' can deliver.

In a first implementation of the invention, the predetermined power $W_P$ of each engine is the OEI 30" power rating of that engine.

In a second implementation of the invention, the predetermined power $W_P$ of each engine is the OEI 2' power rating of that engine.

In a third implementation of the invention, the predetermined power $W_P$ of each engine is the OEI Cont power rating of that engine.

In a fourth implementation of the invention, the predetermined power $W_P$ of each engine is the maximum continuous power MCP of that engine.

In the event of a failure of one engine 13, 13', the other engine 13, 13' of the hybrid power plant 5 remains operational, i.e. is capable of delivering mechanical power to the MGB 11.

During the checking step 20, the operation of each engine 13, 13' is checked and a failure of an engine 13, 13' is detected in known manner by means of each of the electronic control units EECU or indeed each FADEC engine computer if the aircraft has any.

During the monitoring step 25, a monitoring value is determined relating to at least one monitoring parameter and a detection threshold is determined for detecting a deficit in the total power $W_T$, and then a comparison is performed by comparing the monitoring value with the detection threshold.

The monitoring means 9 comprise a plurality of measurement means 3, 6, 7, 8, 6', 7', 8' for measuring monitoring parameters, e.g. the speed of rotation $N_r$ of the main rotor 2 by using the fourth measurement means 3. Likewise, the first measurement means 6, 6' serve to measure the output torque $C_M$ from each engine 13, 13', and in the event of each engine 13, 13' being a turboshaft engine, the second measurement means 7, 7' serve to measure the temperature T4 of the combustion chamber of each turboshaft engine 13, 13', and the third measurement means 8, 8' serve to measure the speed of rotation N1 of the compressor of each turboshaft engine 13, 13'. The monitoring value may be equal to one of these monitoring parameters.

The detection threshold corresponds to a limit of the monitoring value corresponding to the appearance of a deficit in the total power $W_T$, while taking account of a safety margin, thus making it possible to anticipate the appearance of a deficit in the total power $W_T$.

By comparing the monitoring value with the detection threshold, it is possible to identify a risk of there being a deficit in the total power $W_T$ as soon as the monitoring value crosses the detection threshold.

It is also possible to combine a plurality of monitoring parameters using a pre-established relationship, in order to determine the monitoring value and consequently in order to identify reliably any risk of such a deficit occurring in the total power $W_T$. This pre-established relationship may be stored in the memory 16, with the calculation unit 17 executing the pre-established relationship in order to determine the monitoring value.

During this monitoring step 25, it is also possible to determine the time derivative of each monitoring parameter in order to be aware of the variation in the monitoring parameter. The monitoring value may then be the result of a pre-established relationship combining at least one monitoring parameter with its time derivative, thus making it possible in particular to anticipate the appearance of such a deficit in the total power $W_T$ of the hybrid power plant 5.

Depending on the particular monitoring parameter used for determining the monitoring value, the detection threshold for detecting a deficit in the total power $W_T$ may be an upper limit or a lower limit of the monitoring value.

In FIG. 1A, the checking and monitoring steps 20 and 25 are performed sequentially, with the checking step 20 preceding the monitoring step 25. Under such circumstances, a failure of an engine 13, 13' is detected before determining the monitoring value and the detection threshold and then comparing them. Thus, the comparison between the monitoring value and the detection threshold is performed only if a failure of an engine 13, 13' has been detected.

In contrast, in FIG. 1B, the checking and monitoring steps 20 and 25 are performed simultaneously, with the detection of a failure of an engine and the comparison of the monitoring value with the detection threshold being performed in parallel. As a result, as soon as both conditions are true, the method of the invention may be more reactive in delivering the auxiliary power $W_e$ to the MGB 11.

During the control step 30, after an engine failure has been detected and after the detection threshold has been crossed, the electric machine 12 delivers auxiliary power $W_e$ to the MGB 11, thereby making it possible to avoid any deficit in the total power $W_T$ from the hybrid power plant 5 as a result of the engine failure and the request of the pilot of the aircraft 1. The pilot can thus fly the aircraft 1 safely without stressing the engine 13, 13' that remains operational beyond its predetermined operating conditions.

The electric machine 12 is then in motor mode, i.e. it transforms electrical energy stored in the storage means 14 into auxiliary mechanical power.

The auxiliary power $W_e$ to be delivered by the electric machine 12 is used mainly to supplement the power from the engine 13, 13' that remains in operation in the event of the other engine 13, 13' failing.

This electric machine 12 therefore does not replace an engine 13, 13' for driving the main rotor 2 during normal operation of the aircraft 1, but only during particular stages in which the aircraft 1 is in a degraded mode of operation. The maximum power $W_{max}$ of the electric machine 12 can therefore be limited.

Furthermore, the delivery of this auxiliary power $W_e$ to the MGB 11 during the failure of an engine 13, 13' can make it possible firstly to increase the maximum takeoff weight of the aircraft 1 and secondly to increase its flight envelope.

Using the method of the invention makes it possible to limit the extent to which the engines 13, 13' are overdimensioned by reducing the levels of their OEI 30", OEI 2', and OEI Cont power ratings, or even by eliminating them, and can consequently reduce the fuel consumption of the aircraft 1 and possibly also its empty weight.

Consequently, the performance of the aircraft 1 can be improved by this saving in the weight of the aircraft 1, which can make it possible to increase firstly its maximum takeoff weight and secondly its flight envelope.

Furthermore, it is advantageous for the pilot of the aircraft 1 to be continuously aware of the available auxiliary power $W_e$ or of the maximum total driving power $W_T$ available from the hybrid power plant 5, this total driving power $W_T$ being the sum of the predetermined power $W_P$ that the remaining engine 13, 13' can deliver plus the auxiliary power $W_e$ available from the electric machine 12.

The display means 40 of the aircraft 1, as shown in FIG. 3, thus serves to display information 45, 46 relating to this available auxiliary power $W_e$ in the storage means 14. By way of example, this information 46 may be added to the display means 40 used for displaying the power available at the MGB 11 on a dial 42. The display means 40 may also display information indicating whether or not the method is in operation.

For example, the information 46 may be the time remaining during which the auxiliary power $W_e$ can continue to be used at the maximum power $W_{max}$, and the indication as to whether the method is in operation may be the color with which this information 46 is displayed.

It is also possible to display the available auxiliary power $W_e$ in the form of information concerning the maximum total driving power $W_T$ that the hybrid power plant 5 can deliver, e.g. by means of a pointer 45 on the dial 42. In FIG. 3, the markers 43, represent respectively the power available in the OEI 30" and the OEI 2' power ratings. This information, i.e. the position of the pointer 45, may then vary as a function of the electrical energy available in the electrical energy storage means 14.

The storage means 14 are dimensioned so as to enable the pilot to be assisted during the failure of an engine 13, 13', i.e. to store a quantity of electrical energy that is necessary and sufficient. This ensures that the weight of the storage means 14 can be minimized. In addition, the storage means 14 may optionally be rechargeable.

For example, the storage means 14 may comprise at least one rechargeable battery, a thermal battery, or a supercapacitor.

The electric machine 12 is a reversible machine and is equally capable of operating in motor mode and in generator mode. As a result, when it is in generator mode, the electric machine 12 may be used for example to transform mechanical energy of the main rotor 2 or of the engines 13, 13' into electrical energy.

In another implementation of the invention, the electric machine 12 may then operate in generator mode to deliver electrical energy for charging the storage means 14, the storage means 14 being rechargeable, which energy is for use in electrically powering the electric machine 12 and also for providing the aircraft 1 with its general electricity power supply.

Advantageously, the storage means 14 are intended among other purposes to provide the aircraft 1 with its general electrical power supply, and they may then also serve to start the engines 13, 13'. The electric machine 12 operating in generator mode can serve to provide the general electricity power supply of the aircraft 1. As a result, it is possible for the storage means 14 to replace at least one of the batteries that are conventionally used for starting the engines 13, 13' and for the emergency flight of the aircraft 1, and the electric machine 12 may replace at least one main electricity generator of the aircraft 1.

Eliminating at least one battery and/or at least one main electricity generator serves to compensate in part for the increase in weight due to the electric machine 12 and to the storage means 14.

Nevertheless, when the storage means 14 store electrical energy both for delivery to the electric machine 12 and for delivery to the remainder of the aircraft 1, it is essential to avoid using all of this electrical energy for the electric machine 12. In the event of a failure of an engine 13, 13' or of the main electricity generator, the avionics equipment of the aircraft 1 must continue to be powered. As a result, some of the electrical energy available in the storage means 14 is reserved for electrically powering such avionics equipment, while the remainder of the available electrical energy can be delivered to the electric machine 12 in order to deliver auxiliary power $W_e$ to the MGB 11. As a result, the display means 40 display the information 45 in terms only of the remainder of this available electrical energy.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. A method of managing an engine failure on a rotary wing aircraft, said aircraft comprising:
    a hybrid power plant having at least two fuel-burning engines, at least one electric machine, a main gearbox "MGB", and at least one electronic engine control unit "EECU", each EECU being connected to a respective engine, each engine being capable of delivering at least a maximum continuous power MCP rating and OEI 30", OEI 2', and OEI Cont power ratings, said hybrid power plant delivering total driving power $W_T$ to said MGB;
    at least one electrical energy storage means; and
    at least one main rotor that is driven in flight at an instantaneous speed of rotation $N_r$ by said hybrid power plant;
    the method being characterized by:
        a checking step, in which the operation of each engine is checked during each flight by means of said EECU in order to detect a failure, if any, of at least one engine, an engine being considered as having failed when at least one other engine delivers said OEI power rating;
        a monitoring step during which a monitoring value is determined relating to at least one monitoring parameter of said aircraft and a detection threshold is determined for detecting a deficit in said total power $W_T$, a comparison then being performed by comparing said monitoring value with said detection threshold in order to identify a risk of a deficit in said total power $W_T$, said deficit in the total power $W_T$ appearing whenever at least one engine needs to deliver power greater than a predetermined power $W_P$; and
        a control step, during which, when a failure of at least one engine is detected and said detection threshold is crossed, said electric machine is controlled to deliver auxiliary power $W_e$ so that said total driving power $W_T$ from said hybrid power plant is sufficient to fly said aircraft safely, each engine that remains operational not delivering power greater than said predetermined power $W_P$.

2. A method according to claim 1, wherein said monitoring value is equal to said monitoring parameter.

3. A method according to claim 1, wherein said monitoring value is determined in application of a pre-established relationship combining at least two monitoring parameters.

4. A method according to claim 1, wherein a time derivative of each monitoring parameter is determined during said monitoring step, and said monitoring value is determined in application of a pre-established relationship combining at least one monitoring parameter and its time derivative.

5. A method according to claim 1, wherein said aircraft has first measurement means for measuring torque $C_M$ delivered by each engine, and a first monitoring parameter is said torque $C_M$ from each engine.

6. A method according to claim 1, wherein said engines are turboshaft engines and said aircraft has second measurement means for measuring the temperature T4 of the combustion chamber of each engine, and a second monitoring parameter is said temperature T4 of the combustion chamber of the engine.

7. A method according to claim 1, wherein said engines are turboshaft engines and said aircraft has third measurement means for measuring the instantaneous speed of rotation N1 of a compressor of each engine, and a third monitoring parameter is said instantaneous speed of rotation N1.

8. A method according to claim 7, wherein the monitoring value is the difference between said third monitoring parameters for two engines.

9. A method according to claim 1, wherein said aircraft has fourth measurement means for measuring the instantaneous speed of rotation $N_r$ of said main rotor, and a fourth monitoring parameter is said instantaneous speed of rotation $N_r$.

10. A method according to claim 1, wherein said aircraft has display means, and information is displayed on said display means relating to said auxiliary power $W_e$ available from said electric machine and an indication indicating whether said method is in operation.

11. A method according to claim 10, wherein said information is said maximum total driving power $W_T$ that said hybrid power plant can deliver to said MGB.

12. A method according to claim 10, wherein said information is the remaining time during which said electric machine can be used delivering a maximum power $W_{max}$.

13. A method according to claim 1, wherein said predetermined power $W_P$ of each engine is said maximum continuous power MCP of the engine.

14. A method according to claim 1, wherein said predetermined power $W_P$ of each engine is said OEI Cont power rating of the engine.

15. A method according to claim 1, wherein said predetermined power $W_P$ of each engine is said OEI 2' power rating of the engine.

16. A method according to claim 1, wherein said predetermined power $W_P$ of each engine is said OEI 30" power rating of the engine.

17. A rotary wing aircraft including:
    a device for managing an engine failure, the device comprising:
    a hybrid power plant having at least two fuel-burning engines, at least one electric machine, a main gearbox "MGB", and at least one electronic engine control unit "EECU", each EECU being connected to a respective engine, each engine being capable of delivering at least a maximum continuous power MCP rating and OEI 30", OEI 2', and OEI Cont power ratings, said hybrid power plant delivering total driving power $W_T$ to said MGB;
    at least one electrical energy storage means; and
    control means for controlling said electric machine;
    at least one main rotor driven in rotation by said hybrid power plant and rotating in flight at an instantaneous speed of rotation $N_r$;
    wherein said device includes monitoring means for determining a monitoring value relating to at least one monitoring parameter of said aircraft and for determining a detection threshold for detecting a deficit in said total power $W_T$, and then performing a comparison by comparing said monitoring value with said detection threshold in order to identify a risk of a deficit in said total driving power $W_T$, said deficit in the total power $W_T$ appearing whenever at least one engine needs to deliver power greater than a predetermined power $W_P$, said control means communicating with said monitoring means and said electric machine in order to perform the method according to claim 1.

18. An aircraft according to claim 17, wherein said monitoring means include at least one measurement means for evaluating an increase in the power from each engine.

19. An aircraft according to claim 17, wherein said monitoring means include at least one measurement means for evaluating a drop in the power of said main rotor.

20. An aircraft according to claim 17, wherein said monitoring means comprise a calculation unit and a memory, said calculation unit executing instructions stored in said memory and enabling said monitoring value, and said detection threshold for detecting a deficit in said total power $W_T$ to be determined and enabling said comparison to be performed for comparing said monitoring value with said detection threshold.

21. An aircraft according to claim 17, wherein said aircraft includes display means for displaying information relating to said auxiliary power $W_e$ available from said electric machine together with an indication indicating whether said device is in operation.

22. An aircraft according to claim 17, wherein said storage means comprise at least one rechargeable storage means, and said electric machine is capable of operating in generator mode in order to transform mechanical energy of said main rotor into electrical energy for charging said rechargeable storage means.

23. An aircraft according to claim 17, wherein said storage means include at least one rechargeable storage means, and said electric machine is capable of operating in generator mode in order to transform mechanical energy from at least one engine into electrical energy for charging said rechargeable storage means.

* * * * *